(12) United States Patent
Minami (10) Patent No.: US 11,089,182 B2
(45) Date of Patent: Aug. 10, 2021

(54) IMAGE PROCESSING APPARATUS, IMAGE PROCESSING METHOD

(71) Applicant: KYOCERA Document Solutions Inc., Osaka (JP)

(72) Inventor: Takahiro Minami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/016,990

(22) Filed: Sep. 10, 2020

(65) Prior Publication Data

US 2021/0075935 A1   Mar. 11, 2021

(30) Foreign Application Priority Data

Sep. 11, 2019  (JP) .............................. JP2019-165055

(51) Int. Cl.
*H04N 1/64* (2006.01)
*H04N 1/00* (2006.01)
(Continued)

(52) U.S. Cl.
CPC ......... *H04N 1/648* (2013.01); *G06K 9/00469* (2013.01); *H04N 1/00005* (2013.01); (Continued)

(58) Field of Classification Search
CPC .... H04N 1/648; H04N 1/00005; H04N 1/387; H04N 1/00037; H04N 2201/0094; H04N 19/12; H04N 19/17; H04N 19/60; H04N 1/3871; H04N 19/33; H04N 1/00838; H04N 1/00883; H04N 1/403; H04N 1/4072; H04N 1/642; H04N 19/115; H04N 19/124; H04N 19/126; H04N 19/149; H04N 19/15; H04N 19/152; H04N 19/176; H04N 19/186; H04N 19/192; H04N 19/70; H04N 19/93;
(Continued)

(56) References Cited

U.S. PATENT DOCUMENTS 6,285,458 B1 * 9/2001 Yada ........................ H04N 1/41
358/1.13
7,738,143 B2 * 6/2010 Ishimoto ............ H04N 1/00883
358/3.28
(Continued)

FOREIGN PATENT DOCUMENTS

JP         2015186075 A    10/2015

*Primary Examiner* — Negussie Worku
(74) *Attorney, Agent, or Firm* — Alleman Hall Creasman & Tuttle LLP (57) ABSTRACT

A character area is identified in each page by detecting an area in which edge pixels continue in an edge image generated based on each page of a target image. A method of compressing data of each page of the target image is selected based on a ratio of the character area to each page of the edge image. First page data is generated by combining: outlined data of the character area of each page of the target image for which the first compression method has been selected; and compressed data of a background area other than the character area. Second page data is generated by compressing all data of each page of the target image for which the second compression method has been selected, and document data of the plurality of pages is generated by combining the first page data and the second page data.

5 Claims, 4 Drawing Sheets (51) Int. Cl.
    *G06K 9/00*         (2006.01)
    *H04N 1/387*      (2006.01)

(52) U.S. Cl.
    CPC ......... *H04N 1/00037* (2013.01); *H04N 1/387* (2013.01); *H04N 2201/0094* (2013.01)

(58) Field of Classification Search
    CPC ...... H04N 19/98; H04N 1/41; G06K 9/00469; G06K 9/00275; G06K 9/00308; G06K 9/6214; G06K 9/6247; G03G 21/043; G06T 3/4053; H03M 7/30
    USPC ....................................................... 358/1.15
    See application file for complete search history.

(56) References Cited

U.S. PATENT DOCUMENTS

| | | | |
|---|---|---|---|
| 8,452,112 B2* | 5/2013 | Kajiwara | H04N 1/3333 382/243 |
| 8,452,118 B2* | 5/2013 | Shin | G06K 9/40 382/264 |
| 2002/0037100 A1* | 3/2002 | Toda | G06T 9/00 382/166 |
| 2006/0221410 A1* | 10/2006 | Suzuki | H04N 1/409 358/463 |
| 2007/0147929 A1* | 6/2007 | Ishimoto | H04N 1/00838 400/62 |
| 2014/0185103 A1* | 7/2014 | Tsugimura | H04N 1/41 358/426.09 |
| 2015/0254801 A1* | 9/2015 | Hasegawa | G06K 9/4647 345/660 |
| 2017/0249527 A1* | 8/2017 | Sawada | H04N 1/4092 |

* cited by examiner

FIG.1

1a: LIGHT SOURCE
1b: ADF
1c: IMAGE SENSOR
1d: AFE
500: FRAME MEMORY
50a: EDGE IMAGE GENERATING PORTION
50a: EDGE IMAGE GENERATING PORTION
51a: MAIN CONTROL PORTION
51b: JOB CONTROL PORTION
51c: UNIT DATA VALIDITY DETERMINING PORTION
51d: CHARACTER AREA IDENTIFYING PORTION
51e: VARIATION DERIVING PORTION
51f: METHOD SELECTING PORTION
51g: DOCUMENT DATA GENERATING PORTION

IMAGE PROCESSING APPARATUS, IMAGE PROCESSING METHOD

INCORPORATION BY REFERENCE

This application is based upon and claims the benefit of priority from the corresponding Japanese Patent Application No. 2019-165055 filed on Sep. 11, 2019, the entire contents of which are incorporated herein by reference.

BACKGROUND

The present disclosure relates to an image processing apparatus and an image processing method for generating document data by applying different processes to data of character areas and a background area in a target image.

An image reading apparatus and an image processing apparatus such as a copier or a multifunction peripheral have a function to read an image from a document sheet and generate PDF (Portable Document Format) data from data of the read image. Normally, the PDF data is document data that is obtained by compressing data of a target image by a compression method such as the JPEG method. In the following description, PDF data that is obtained by compressing data of a target image by one compression method is referred to as normal PDF data.

On the other hand, there is known an image processing apparatus that has a function to generate what is called highly compressed PDF data from read image data.

The highly compressed PDF data is generated by applying different processes to character areas and a background area in the read image data to generate two types of compressed data, and combining the two types of compressed data. In addition, data of the character areas is subjected to an outlining process before being compressed.

SUMMARY

An image processing apparatus according to an aspect of the present disclosure generates document data of a plurality of pages by compressing data of a plurality of pages of a target image. The image processing apparatus includes an edge image generating portion, a character area identifying portion, a method selecting portion, and a document data generating portion. The edge image generating portion generates data of each of a plurality of pages of an edge image from data of each of the plurality of pages of the target image. The character area identifying portion identifies a character area in each page of the edge image by detecting an area in which edge pixels continue in each page of the edge image. The method selecting portion selects, as a method of compressing data of the target image, a first compression method or a second compression method for each page of the target image, based on a ratio of the character area to each page of the edge image. The document data generating portion generates first page data by combining: outlined data that is generated by outlining data of the character area of each page of the target image for which the first compression method has been selected; and data that is generated by applying a compression process to data of a background area other than the character area of each page of the target image for which the first compression method has been selected, generates second page data by applying a same compression process to all data of each page of the target image for which the second compression method has been selected, and generates the document data of the plurality of pages by combining the first page data and the second page data.

An image processing method according to another aspect of the present disclosure is a method by which an image processing apparatus generates document data of a plurality of pages by compressing data of a plurality of pages of a target image. The image processing method includes generating data of each of a plurality of pages of an edge image from data of each of the plurality of pages of the target image. The image processing method further includes identifying a character area in each page of the edge image by detecting an area in which edge pixels continue in each page of the edge image. The image processing method further includes selecting, as a method of compressing data of the target image, a first compression method or a second compression method for each page of the target image, based on a ratio of the character area to each page of the edge image. The image processing method further includes generating first page data by combining: outlined data that is generated by outlining data of the character area of each page of the target image for which the first compression method has been selected; and data that is generated by applying a compression process to data of a background area other than the character area of each page of the target image for which the first compression method has been selected, generating second page data by applying a same compression process to all data of each page of the target image for which the second compression method has been selected, and generating the document data of the plurality of pages by combining the first page data and the second page data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 of the present embodiment executes jobs regarding image processing. For example, the image processing apparatus 10 is a copier, a facsimile apparatus, or a multifunction peripheral.

Figure 1:
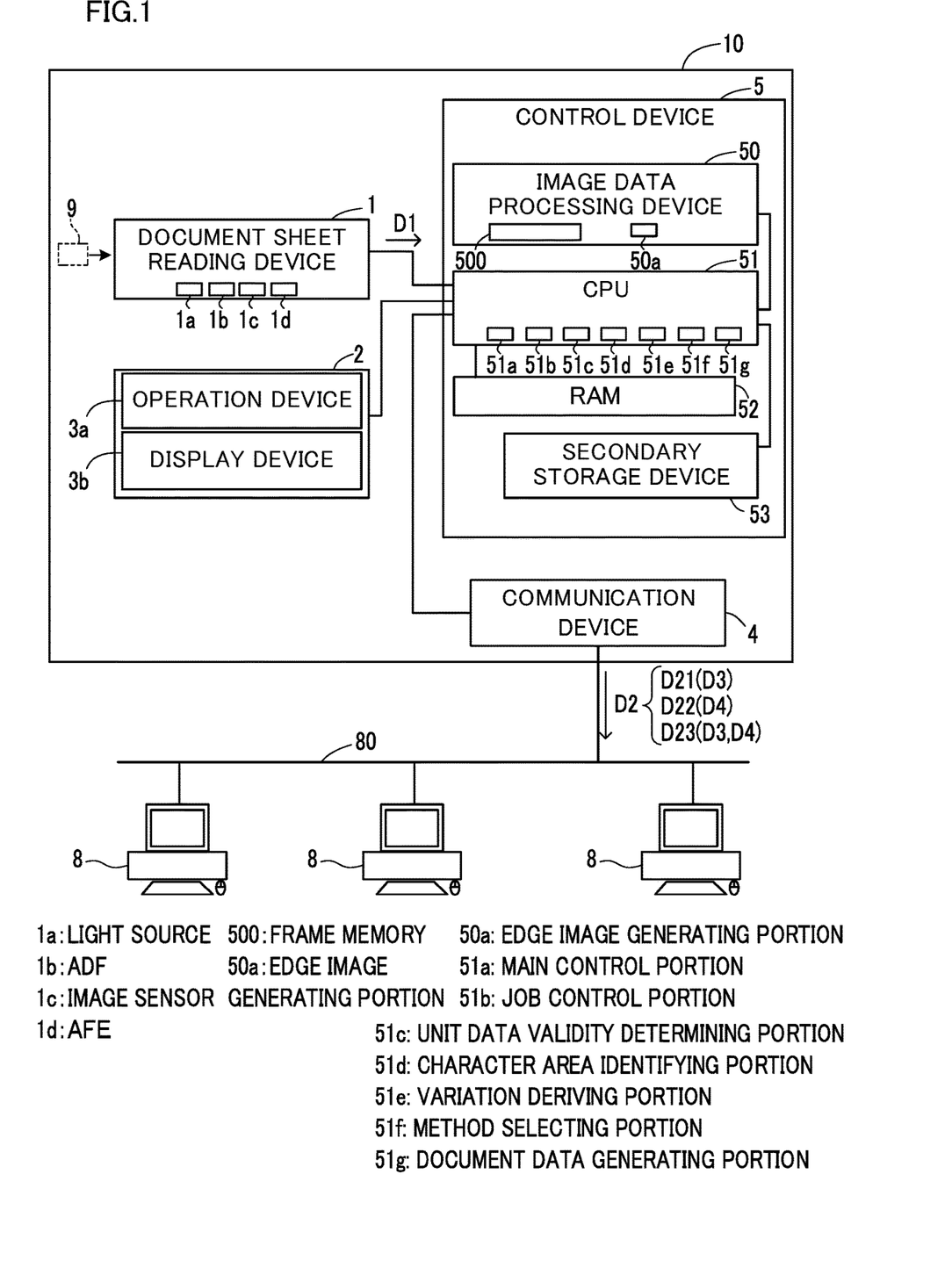
FIG. 1 is a block diagram showing a configuration of an image processing apparatus according to an embodiment of the present disclosure.

In the example shown in FIG. 1, the image processing apparatus 10 is a scanner that includes a document sheet reading device 1. The document sheet reading device 1 executes a document sheet reading process to read an image from a document sheet 92.

The image processing apparatus 10 executes a job, such as a scan data transmission job, that includes the document sheet reading process.

In the following description, an image read from the document sheet 92 during the document sheet reading process performed by the document sheet reading device 1, is referred to as a read image. In addition, data of the read image output by the document sheet reading device 1 during the document sheet reading process is referred to as read image data D1 (see FIG. 1).

The image processing apparatus 10 is configured to communicate with a plurality of host apparatuses 8 via a network 80 such as a LAN (Local Area Network). The host apparatuses 8 are computers configured to communicate with the image processing apparatus 10.

As shown in FIG. 1, the image processing apparatus 10 includes the document sheet reading device 1, a user interface device 2, a communication device 4, and a control device 5.

In addition, the control device 5 includes an image data processing device 50, a CPU (Central Processing Unit) 51, a RAM (Random Access Memory) 52, and a secondary storage device 53.

The user interface device 2 includes an operation device 3a and a display device 3b. The operation device 3a is configured to receive human operations, and includes, for example, an operation button and a touch panel. The display device 3b includes a display panel, such as a liquid crystal panel, that can display information. It is noted that the human operation includes an operation by a human hand, as well as an operation by human voice or human line-of-sight.

The communication device 4 is communication interface device that performs a communication with the host apparatuses 8 via the network 80. The control device 5 performs all the data transmissions and receptions with the host apparatuses 8 via the communication device 4.

The document sheet reading device 1 includes a light source 1a, an ADF (Automatic Document Feeder) 1b, an image sensor 1c, and an AFE (Analog Front End) 1d.

The light source 1a emits light toward the document sheet 92. The ADF 1b conveys the document sheet 92 along a document sheet conveyance path passing a position that faces the light source 1a. This allows the light from the light source 1a to scan the document sheet 92.

The image sensor 1c receives reflection light from the document sheet 92, and outputs, as an image signal, a detection signal of a received amount of light. The AFE 1d converts the image signal to digital image data.

The control device 5 controls various types of calculations, data processing, and various electric devices included in the image processing apparatus 10. The control device 5 is configured to transmit and receive data and control signals to and from the document sheet reading device 1, the user interface device 2, and the communication device 4.

The image data processing device 50 executes various types of image processing in accordance with commands from the CPU 51. The image data processing device 50 may be a processor such as an MPU (Micro Processing Unit) or a DSP (Digital Signal Processor), or a circuit such as an ASIC (Application Specific Integrated Circuit).

In addition, the image data processing device 50 includes a frame memory 500 that is a volatile storage device configured to temporarily store image data that is subjected to image processing. The image data processing device 50 is configured to transmit and receive the image data to and from the CPU 51 via the frame memory 500.

The RAM 52 is a computer-readable volatile storage device. The RAM 52 is configured to temporarily store: a computer program executed by the CPU 51; and various types of data that are consulted or output by the CPU 51.

The secondary storage device 53 is a computer-readable nonvolatile storage device. The secondary storage device 53 is configured to preliminarily store: the computer program executed by the CPU 51; and various types of data consulted by the CPU 51.

For example, either a SSD (Solid State Drive) or a hard disk drive, or a combination of both is adopted as the secondary storage device 53.

The CPU 51 is a processor that expands the computer program stored in the secondary storage device 53 onto the RAM 52, and executes the expanded computer program. This allows the CPU 51 to execute various types of data processing and the controls. It is noted that another processor such as a DSP may execute the various types of data processing and the controls in place of the CPU 51.

The CPU 51 includes a plurality of processing modules that are activated as the computer program is executed. The plurality of processing modules include a main control portion 51a and a job control portion 51b.

The main control portion 51a mainly monitors an operation on the operation device 3a and data reception by the communication device 4, and upon detecting an operation or data reception, controls a start of a process in correspondence with the detected operation or data reception.

The job control portion 51b causes either or both of the document sheet reading device 1 and the communication device 4 to execute a job in response to a job execution request received from any one of the host apparatuses 8 or a job execution request input by an operation on the operation device 3a.

During the scan data transmission job, the document sheet reading device 1 executes the document sheet reading process to output the read image data D1, the image data processing device 50 and the CPU 51 generate, from the read image data D1, document data D2 representing the read image, and the communication device 4 transmits the document data D2 to a host apparatus 8 that has been specified in advance (see FIG. 1).

In the following description, an image from which the document data D2 is generated is referred to as a target image g1 (see FIG. 3). In the scan data transmission job, the read image is the target image g1. The document data D2 is generated by applying a compression process on the data of the target image g1.

Figure 3:
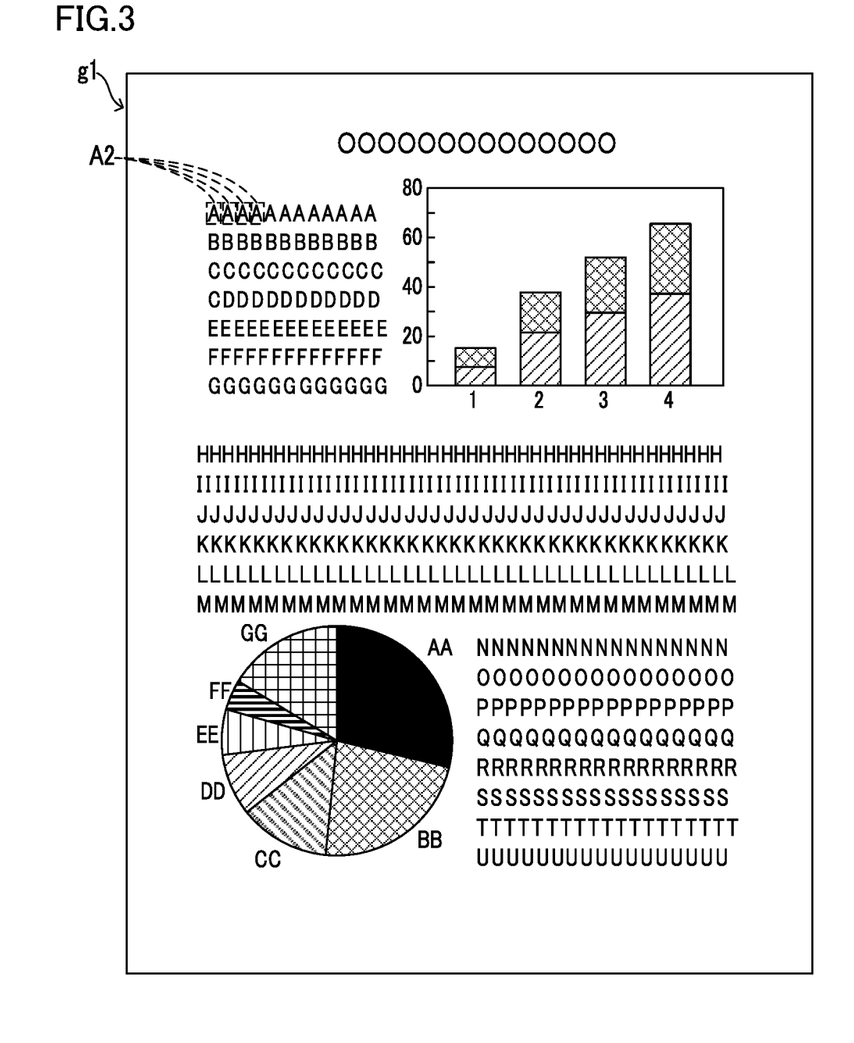
FIG. 3 is a diagram showing an example of a target image.

In the present embodiment, at least part of the target image g1 includes character areas A2 that are character image areas (see FIG. 3). As described below, when generating the document data D2, the image processing apparatus 10 may apply different processes to: data of the character areas A2 in the data of the target image g1; and data of a background area other than the character areas A2 in the data of the target image g1.

In the present embodiment, the document data D2 is PDF data. In addition, the main control portion 51a is configured to select, as an operation mode during the scan data transmission job, one of a normal mode, a high-compression mode, and an automatic selection mode according to an operation performed on the operation device 3a.

In the normal mode, the image data processing device 50 and the CPU 51 generate, as the document data D2, normal PDF data D21 that includes normally compressed page data D3 and does not include highly compressed page data D4 (see FIG. 1).

The normally compressed page data D3 is PDF data of one page that is obtained by applying a same compression process to all data of the target image g1 including the character areas A2. A compression method adopted to generate the normally compressed page data D3 is an irreversible compression method such as the JPEG method.

The highly compressed page data D4 is PDF data of one page that is obtained by combining two types of compressed data that are obtained by applying different compression processes to: outline data of the data of the character areas A2 in the data of the target image g1; and the data of the background area other than the character areas A2.

The outline data is generated by outlining the data of the character areas A2. More specifically, the outline data is obtained by performing a color reduction process on the data of the character areas A2 and performing an outlining process on data after color reduction. A compression method adopted to generate the outline data is a reversible compression method such as the MMR (Modified Modified READ) compression method.

In the high-compression mode, the image data processing device 50 and the CPU 51 generate, as the document data D2, high-compression PDF data D22 that includes the highly compressed page data D4 and does not include the normally compressed page data D3 (see FIG. 1).

Figure 2:
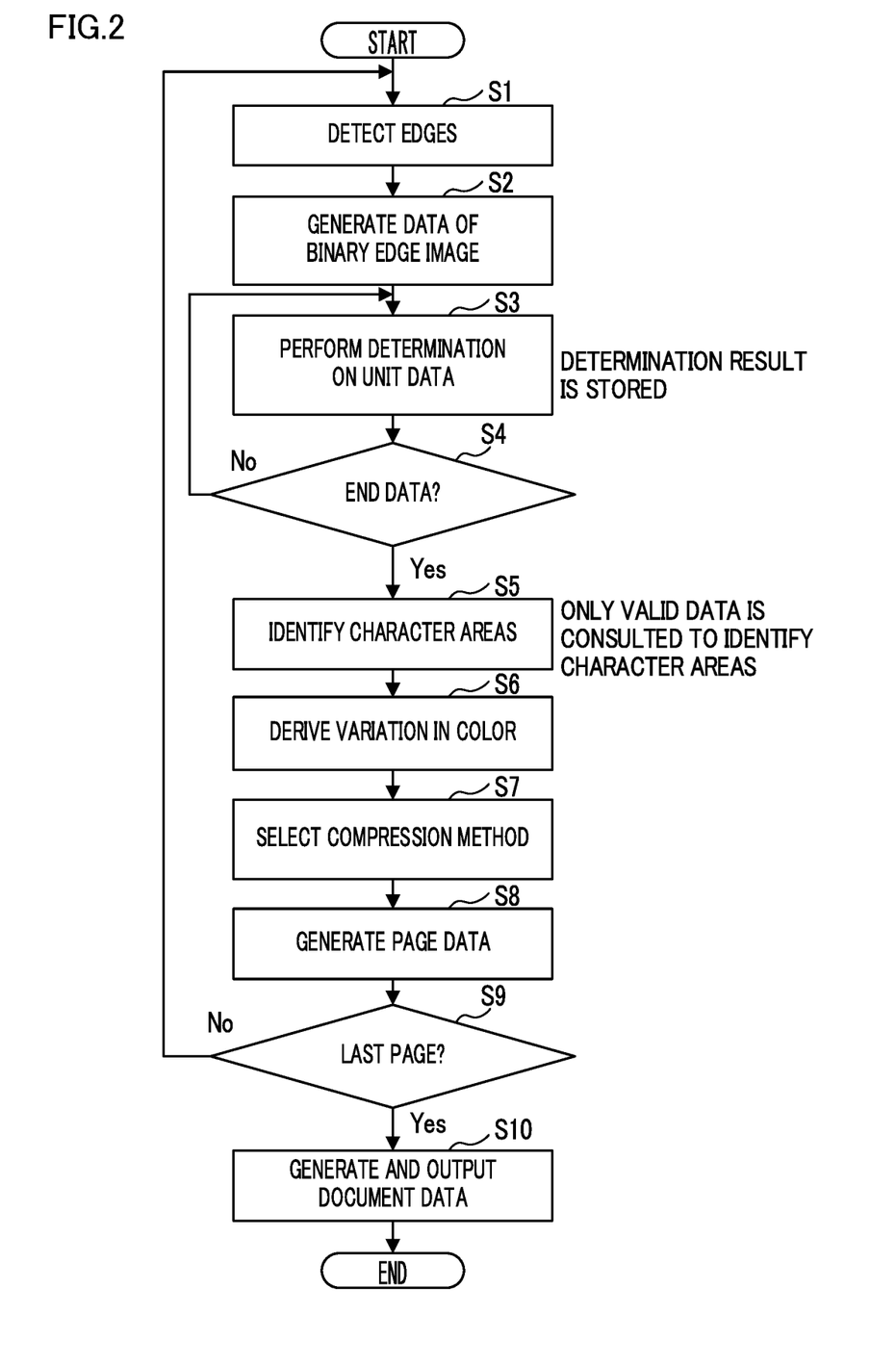
FIG. 2 is a flowchart showing an example of a procedure of a document data generating process executed in an automatic selection mode in the image processing apparatus according to the embodiment of the present disclosure.

In the automatic selection mode, the image data processing device 50 and the CPU 51 generate the document data D2 by executing a document data generating process shown in FIG. 2. The document data generating process is described below.

Meanwhile, the high-compression PDF data D22 obtained may have an excellent image quality or a faulty image quality depending on the content of the target image g1. As a result, the target image g1 may be suitable for generating the high-compression PDF data D22 or may be suitable for generating the normal PDF data D21, depending on the content of the target image g1.

However, it is difficult for the user to select a format of the PDF data that is suitable for the content of the target image g1. In particular, in a case where the target image g1 from which the PDF data is generated is composed of a plurality of pages, the suitable format of the PDF data may be different for each page.

On the other hand, in the image processing apparatus 10, when the image data processing device 50 and the CPU 51 generate the document data D2 from data of a plurality of pages of target image g1 in the automatic selection mode, they execute the document data generating process shown in FIG. 2. This allows the image processing apparatus 10 to adopt a suitable compression method for each page of the target image g1, thereby generating the document data D2 of an excellent image quality.

The image data processing device 50 includes an edge image generating portion 50a as a module for executing the document data generating process shown in FIG. 2.

In addition, the CPU 51 further includes, as the processing modules for executing the document data generating process, a unit data validity determining portion 51c, a character area identifying portion 51d, a variation deriving portion 51e, a method selecting portion 51f, and a document data generating portion 51g.

As described above, the processing modules are activated as the CPU 51 executes the computer program. During the scan data transmission job, the edge image generating portion 50a, the unit data validity determining portion 51c, the character area identifying portion 51d, the method selecting portion 51f, and the document data generating portion 51g process the read image data D1 as the data of the target image g1.

The edge image generating portion 50a, the unit data validity determining portion 51c, the character area identifying portion 51d, the method selecting portion 51f, and the document data generating portion 51g generate the document data D2 of a plurality of pages by compressing data of a plurality of pages of target image g1.

[Document Data Generating Process in Automatic Selection Mode]

The following describes an example of the procedure of the document data generating process in the automatic selection mode with reference to the flowchart shown in FIG. 2. The document data generating process is an example of the procedure of the image processing method of the present embodiment.

The job control portion 51b starts the document data generating process upon acquiring data of the first page of the target image g1 from which the document data D2 is generated. In the following description, S1, S2, . . . are identification signs representing a plurality of steps of the document data generating process.

<Step S1>

In the document data generating process in the automatic selection mode, first, the process of step S1 is executed.

In step S1, the edge image generating portion 50a of the image data processing device 50 executes an edge detection process on the data of the target image g1 to detect edge pixels of the target image g1.

<Step S2>

Figure 4:
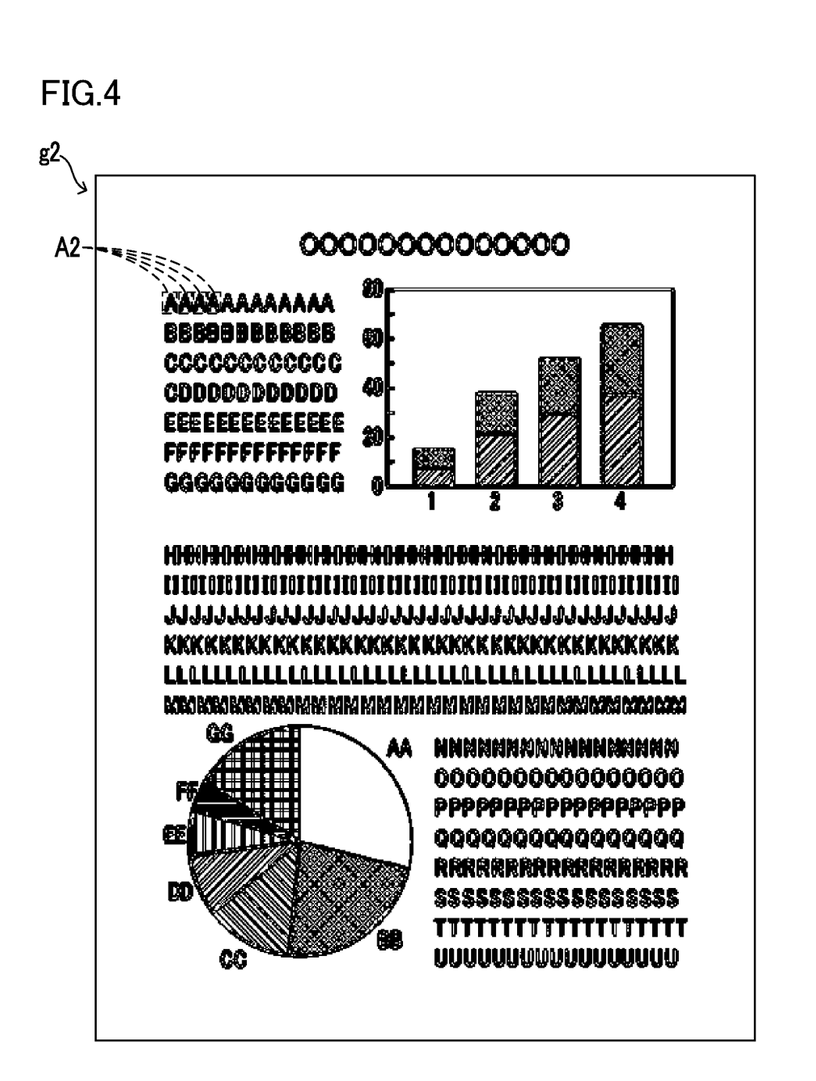
FIG. 4 is a diagram showing an example of an edge image.

Subsequently, the edge image generating portion 50a converts data of the edge pixels to data of an edge image g2 in which one pixel is assigned for each bit (see FIG. 4). The data of the edge image g2 is recorded in the frame memory 500.

In the data of the edge image g2, the edge pixels are high bits, and the remaining pixels are low bits. The pixels of the edge image g2 respectively correspond to the pixels of the target image g1.

In steps S1 and S2, the edge image generating portion 50a generates data of each page of the edge image g2 from data of each page of the target image g1.

<Step S3>

Subsequently, the unit data validity determining portion 51c of the CPU 51 determines whether or not a piece of unit data of the edge image g2 is valid data, wherein each piece of unit data is composed of a predetermined unit number of bits. The process of step S3 is performed sequentially for each piece of unit data.

The unit data validity determining portion 51c determines that the piece of unit data is valid data when the piece of unit data includes edge pixels whose amount exceeds a predetermined reference amount. As described below, the valid data is target data from which the character areas A2 are detected.

Normally, the reference amount is set to one. In this case, the unit data validity determining portion 51c determines that a piece of unit data is valid data when the piece of unit data includes at least one high bit.

In step S3, the unit data validity determining portion 51c consults the data of the edge image g2 from the start point to the end point sequentially by the unit number of bits.

It is noted that the less the valid data is, the less the time required to detect the character areas A2 is. In view of this, to reduce the time required to detect the character areas A2, the reference amount may be set to a number larger than one. For example, the reference amount may be set to two or four.

In the following description, in each piece of unit data of the edge image g2, data other than the valid data is referred to as invalid data.

<Step S4>

Subsequently, the unit data validity determining portion 51c determines whether or not the piece of unit data consulted in step S3 is end data of the data of the edge image g2. Upon determining that the piece of unit data is the end data, the unit data validity determining portion 51c moves the process to step S5. Otherwise, the unit data validity determining portion 51c repeats the process of step S3 to consult the remaining pieces of unit data of the edge image g2.

<Step S5>

In step S5, the character area identifying portion 51d identifies the character areas A2 in each page of the edge image g2, by detecting areas in which the edge pixels continue in each page of the edge image g2. Thereafter, the character area identifying portion 51d moves the process to step S6.

In step S5, the character area identifying portion 51d identifies the character areas A2 by consulting only pieces of unit data that have been determined as valid data.

It is noted that determining in step S3 whether or not each piece of unit data is the valid data is aimed to narrow data that is consulted to identify the character areas A2 in the edge image g2, and speed up the process of identifying the character areas A2.

Among the whole area of one page of edge image g2, the area other than the character areas A2 is the background area. The character areas A2 and the background area of the edge image g2 are also the character areas A2 and the background area of the target image g1.

It is noted that steps S1 to S5 are an example of an area dividing process in which the data of the target image g1 is divided into data of the character areas and data of the background area.

In addition, the edge image generating portion 50a, the unit data validity determining portion 51c, and the character area identifying portion 51d that execute the processes of steps S1 to S5 are an example of an area dividing portion that divides the data of the target image g1 into data of the character areas and data of the background area.

<Step S6>

In step S6, the variation deriving portion 51e derives a variation in the color of the pixels of the character areas A2 in each page of the edge image g2. The variation deriving portion 51e then moves the process to step S7.

It is noted that when no character area A2 is identified in step S5, the process of step S6 is skipped.

For example, the variation deriving portion 51e derives, as the variation in the color, a variation in the hue and a variation in the saturation of the pixels of the character areas A2 in each page of the edge image g2. It is noted that either the variation in the hue or the variation in the saturation may be derived as the variation in the color.

The variation is, for example, the standard deviation or the dispersion. In addition, the variation deriving portion 51e may generate histograms of the hue and saturation of the pixels of the character areas A2 and divide them into a plurality of classes. In this case, the variation deriving portion 51e converts the hue and the saturation into a hue index value and a saturation index value corresponding to the classes, and derives the standard deviation or the dispersion of the hue index value and the saturation index value as the variation in the hue and the variation in the saturation.

<Step S7>

In step S7, the method selecting portion 51f selects a first compression method or a second compression method based on the ratio of the character areas A2 to each page of the edge image g2 and the variation in the color of the pixels of the character areas A2. The method selecting portion 51f then moves the process to step S8.

The first compression method is adopted when the highly compressed page data D4 is generated from the data of the target image g1. The second compression method is adopted when the normally compressed page data D3 is generated from the data of the target image g1.

For example, the method selecting portion 51f selects the first compression method when all of an area condition, a hue condition, and a saturation condition shown below are satisfied. Otherwise, the method selecting portion 51f selects the second compression method.

The area condition is that the ratio of the character areas A2 to the edge image g2 exceeds a predetermined reference ratio. The hue condition is that the variation in the hue of the pixels of the character areas A2 in the target image g1 does not exceed a predetermined allowed hue variation. The saturation condition is that the variation in the saturation of the pixels of the character areas A2 in the target image g1 does not exceed a predetermined allowed saturation variation.

The selection process of step S7 is executed when one or more character areas A2 are identified in step S5. It is noted that the method selecting portion 51f selects the second compression method when no character area A2 is identified in step S5.

<Step S8>

In step S8, the document data generating portion 51g of the CPU 51 generates page data for one page of the document data D2 from the data of the target image g1 in accordance with the compression method selected in step S7. The document data generating portion 51g then moves the process to step S9.

The page data generated in accordance with the first compression method is the highly compressed page data D4, and the page data generated in accordance with the second compression method is the normally compressed page data D3. It is noted that the highly compressed page data D4 is an example of the first page data, and the normally compressed page data D3 is an example of the second page data.

That is, when the first compression method has been selected for a page of the target image g1, the document data generating portion 51g performs the color reduction process on the data of the character areas A2 of the page of the target image g1, and further performs an outlining process on data after the color reduction. This allows the outline data corresponding to the data of the character areas A2 to be obtained.

Furthermore, the document data generating portion 51g generates compressed character image data by applying a compression process of a reversible compression method such as the MMR compression to the outline data. Furthermore, the document data generating portion 51g generates compressed background image data by applying a compression process of an irreversible compression method such as the JPEG compression to the data of the background area of the page of the target image g1 for which the first compression method has been selected.

The document data generating portion 51g generates the highly compressed page data D4 by combining the compressed character image data and the compressed background image data.

On the other hand, when the second compression method has been selected, the document data generating portion 51g generates the normally compressed page data D3 by applying a same compression process to all data of the page of the target image g1 for which the second compression method has been selected. A compression method adopted in the second compression method is an irreversible compression method such as the JPEG method.

<Step S9>

In step S9, the document data generating portion 51g determines whether or not the page data generated in step S8 is the data of the last page of the target image g1. Upon determining that the page data generated in step S8 is the data of the last page, the document data generating portion 51g moves the process to step S10. Otherwise, the document data generating portion 51g moves the process to step S1.

When the process is moved to step S1, the processes of steps S1 to S9 are executed for the next page of the target image g1. In this way, page data corresponding to all pages of the target image g1, namely the processing target, is generated.

<Step S10>

In step S10, the document data generating portion 51g generates the document data D2 by combining a plurality of pieces of page data corresponding to all pages of the target image g1. Furthermore, the document data generating portion 51g outputs the generated document data D2, as one data file, to one of the host apparatuses 8 that has been specified in advance via the communication device 4. It is noted that the document data D2 may be stored in the secondary storage device 53.

After completing the process of step S10, the document data generating portion 51g ends the document data generating process. Step S10 is an example of a document data generating step.

In general, when the ratio of the character areas A2 to the target image g1 is small, data compression effect is low even when the target image g1 is compressed to the highly compressed page data D4.

In addition, when the ratio of the character areas A2 to the target image g1 is small, another image area such as a pattern may be identified as the character area A2 wrongly. When subjected to the outlining process and the MMR compression, data of correctly identified character areas A2 becomes data of excellent image quality with high compression effect.

However, when data of areas wrongly identified as the character areas A2 are subjected to the outlining process and the MMR compression, the obtained data may have a deteriorated image quality.

Accordingly, with the configuration where satisfaction of the area condition is included in the requirement for the first compression method to be selected in step S7 of FIG. 2, the highly compressed page data D4 is generated from the data of the target image g1 that has a high compression effect and a low possibility that the character areas A2 are wrongly identified.

In addition, data that is suitable for the outlining process and the MMR process is data of character images of a single color. Accordingly, with the configuration where satisfaction of the hue condition and the saturation condition is included in the requirement for the first compression method to be selected in step S7 of FIG. 2, data of the target image g1 that is suitable for the outlining process and the MMR process is selectively compressed by the first compression method.

As described above, in the image processing apparatus 10, the automatic selection mode may be preliminarily selected by, for example, an operation performed on the operation device 3a such that when the document data D2 is generated from data of a plurality of pages of target image g1, an appropriate compression method is adopted in response to the content of each page of the target image g1. This makes it possible to generate the document data D2 of an excellent image quality with high compression effect.

[First Application Example]

The following describes a first application example of the image processing apparatus 10. The present application example differs from the image processing apparatus 10 in content of steps S6 and S7 of FIG. 2.

In the present application example, the process of step S6 of FIG. 2 executed by the variation deriving portion 51e is omitted.

In the present application example, in step S7 of FIG. 2, the method selecting portion 51f selects, as a method of compressing data of each page of the target image g1, a first compression method or a second compression method based on the ratio of the character areas A2 to each page of the edge image g2.

Specifically, the method selecting portion 51f of the present application example selects the first compression method when the area condition is satisfied. Otherwise, the method selecting portion 51f selects the second compression method. The adoption of the present application example produces the same effect as the adoption of the image processing apparatus 10 of the above-described embodiment.

[Second Application Example]

In the image processing apparatus 10, the image data processing device 50 may be implemented as a processing module of the CPU 51.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus that generates document data of a plurality of pages by compressing data of a plurality of pages of a target image, the image processing apparatus comprising:
   a processor configured to execute:
      an edge image generating portion configured to generate data of each of a plurality of pages of an edge image from data of each of the plurality of pages of the target image;
      a character area identifying portion configured to identify a character area in each page of the edge image by detecting an area in which edge pixels continue in each page of the edge image;
      a variation deriving portion configured to derive a variation in color of pixels of the character area in each page of the edge image;

a method selecting portion configured to select, as a method of compressing data of the target image, a first compression method or a second compression method for each page of the target image, based on a ratio of the character area to each page of the edge image and the variation in the color of the pixels of the character area; and a document data generating portion configured to:
generate first page data by combining: outlined data that is generated by outlining data of the character area of each page of the target image for which the first compression method has been selected; and data that is generated by applying a compression process to data of a background area other than the character area of each page of the target image for which the first compression method has been selected, generate second page data by applying a same compression process to all data of each page of the target image for which the second compression method has been selected, and generate the document data of the plurality of pages by combining the first page data and the second page data.

2. The image processing apparatus according to claim 1, wherein
the variation deriving portion derives, as the variation in the color, a variation in either or both of a hue and a saturation of the pixels of the character area in each page of the edge image.

3. The image processing apparatus according to claim 1, wherein the first page data and the second page data are Portable Document Format (PDF) data.

4. An image processing method by which an image processing apparatus generates document data of a plurality of pages by compressing data of a plurality of pages of a target image, the image processing method comprising:

at a processor:
generating data of each of a plurality of pages of an edge image from data of each of the plurality of pages of the target image;

identifying a character area in each page of the edge image by detecting an area in which edge pixels continue in each page of the edge image;

deriving a variation in color of pixels of the character area in each page of the edge image;

selecting, as a method of compressing data of the target image, a first compression method or a second compression method for each page of the target image, based on a ratio of the character area to each page of the edge image and the variation in the color of the pixels of the character area;

generating first page data by combining:
outlined data that is generated by outlining data of the character area of each page of the target image for which the first compression method has been selected; and data that is generated by applying a compression process to data of a background area other than the character area of each page of the target image for which the first compression method has been selected;

generating second page data by applying a same compression process to all data of each page of the target image for which the second compression method has been selected; and generating the document data of the plurality of pages by combining the first page data and the second page data.

5. The image processing method according to claim 4, wherein the first page data and the second page data are Portable Document Format (PDF) data.

* * * * *